United States Patent
Kang et al.

(10) Patent No.: US 6,937,297 B2
(45) Date of Patent: Aug. 30, 2005

(54) LIQUID DISPLAY DEVICE HAVING A PLURALITY OF FIXING PIECES ON CORNERS OF ITS PANEL MODULE

(75) Inventors: Chou-Yu Kang, Tainan (TW); Chien-Yu Lin, Taipei (TW)

(73) Assignee: Chi Mei Optoelectronics Corp., Tainan (TW)

( * ) Notice: Subject to any disclaimer, the term of this patent is extended or adjusted under 35 U.S.C. 154(b) by 212 days.

(21) Appl. No.: 10/213,800

(22) Filed: Aug. 7, 2002

(65) Prior Publication Data

US 2003/0147023 A1 Aug. 7, 2003

(30) Foreign Application Priority Data

Jan. 22, 2002 (CN) .......................... 91200571 U

(51) Int. Cl.⁷ ............................................ G02F 1/1333
(52) U.S. Cl. ......................... 349/58; 349/60; 361/681; 361/714; 361/752; 455/90
(58) Field of Search ..................... 349/58, 60; 361/681, 361/714, 752; 455/90

(56) References Cited

U.S. PATENT DOCUMENTS

| | | | | |
|---|---|---|---|---|
| 6,166,788 A | * | 12/2000 | Ha et al. | 349/58 |
| 6,175,396 B1 | * | 1/2001 | Kim et al. | 349/58 |
| 6,654,078 B1 | * | 11/2003 | Kato et al. | 349/58 |

* cited by examiner

*Primary Examiner*—Huyen Ngo
(74) *Attorney, Agent, or Firm*—Senniger Powers

(57) ABSTRACT

The present invention mainly relates to a liquid crystal display device comprising a housing and a panel module. The panel module has generally a rectangular shape having four sides and four corners. The housing comprises a mold frame, a plurality of fixing pieces and a plurality of fixing structures being adapted to fix the fixing pieces to the mold frame. The mold frame has at least three rims and is adapted to directly and firmly hold and receive the panel module. Each of the fixing pieces is located at the corner of the panel module and comprises a panel module fixing rib and a lateral fixing portion securely fitted onto the corner of the panel module to clamp the panel module coupled to the mold frame.

20 Claims, 8 Drawing Sheets

LIQUID DISPLAY DEVICE HAVING A PLURALITY OF FIXING PIECES ON CORNERS OF ITS PANEL MODULE

BACKGROUND OF THE INVENTION

1. Field of the Invention

The present invention mainly relates to a liquid crystal display device, more particularly, to a housing used in a liquid crystal display device.

2. Description of the Related Art

Nowadays, consumers require a liquid crystal display device to be in light weight and at low price. Thus, various designs of liquid crystal devices are directed to the reduction of their weight and cost. FIG. 1 illustrates that a liquid crystal display device comprising a housing 1 wherein the housing 1 comprises a mold frame 11 and a metal frame 12. The mold frame 11 is adapted to hold and support a panel module 2. The panel module 2 comprises a liquid crystal display panel and a plurality of sheets. The metal frame 12 comprises a panel module fixing rib 121 and a lateral fixing portion 122. Besides, a shape of the metal frame 12 complies with a shape of the mold frame 11. The metal frame 12 combines the mold frame 11 for fixing the liquid crystal display device; wherein the lateral fixing portion 122 is used in fixing lateral sides of the mold frame 11 and the panel module fixing rib 121 is used in holding the panel module 2.

Because the metal frame 12 wraps whole top lateral sides of the liquid crystal display device, volume and weight thereof cannot be reduced.

Besides, cost rises due to using more materials. Additionally, in order to manufacture different sizes of liquid crystal display device, different sizes of mold of metal frame are needed. Thus, mold used to manufacture metal frame raises cost and inconvenience as well.

Therefore, the present invention is directed to developing a novel and improved housing and a liquid crystal display device to make them lightly weight, less cost for manufacture and easier to apply, but also retaining mechanical strength.

SUMMARY OF THE INVENTION

One objective of the present invention is to provide a liquid crystal display device comprising a housing and a panel module. The housing comprising a mold frame, a plurality of fixing pieces and a plurality of fixing structures being adapted to fix the fixing pieces to the mold frame, wherein the mold frame is adapted to hold and support the panel module, wherein each of the fixing pieces comprises a panel module fixing rib to hold the panel module, and a lateral fixing portion to be coupled to the mold frame. The present invention avoids using metal frames in the prior art and reduces weight of the liquid crystal display device; furthermore, the housing and mechanical strength are up to a standard of utility in this field.

BRIEF DESCRIPTION OF THE DRAWINGS

FIG. 3b is a perspective view illustrating the housing in FIG. 3a;

FIG. 4b is a perspective view illustrating the housing in FIG. 4a;

FIG. 5b is a perspective view illustrating the housing in FIG. 5a;

FIG. 6b is a perspective view illustrating the housing in FIG. 6a; FIG. 7b is a perspective view illustrating the housing in FIG. 7a.

DETAILED DESCRIPTION OF THE INVENTION

The preferred embodiments in the invention are described below.

The First Embodiment

Figure 1:
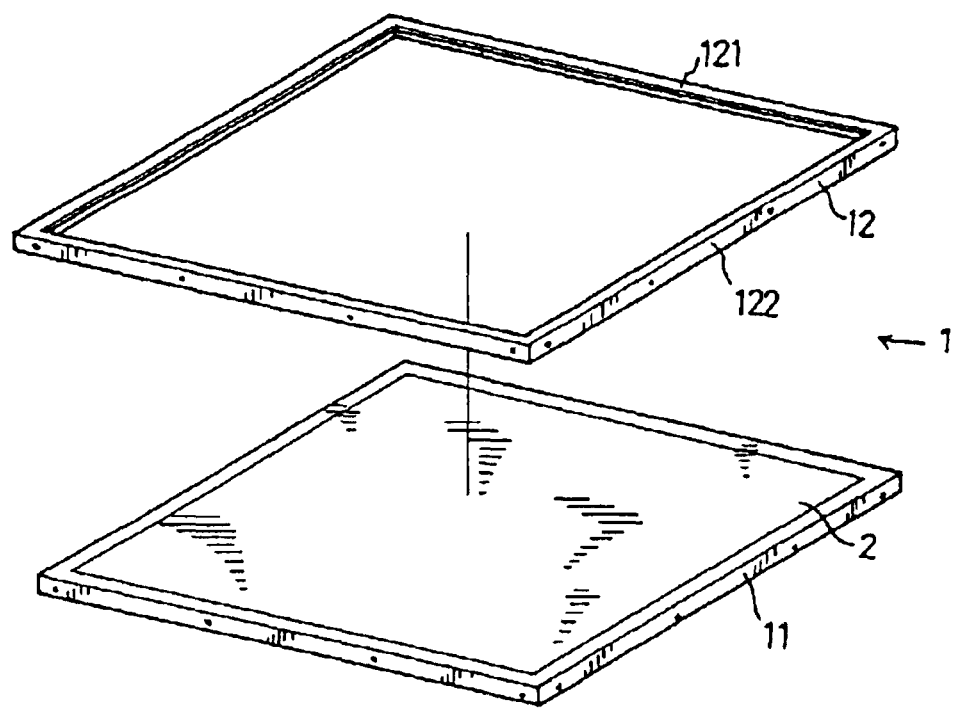
FIG. 1 is an exploded view illustrating a conventional housing of liquid crystal display device.
Figure 2:
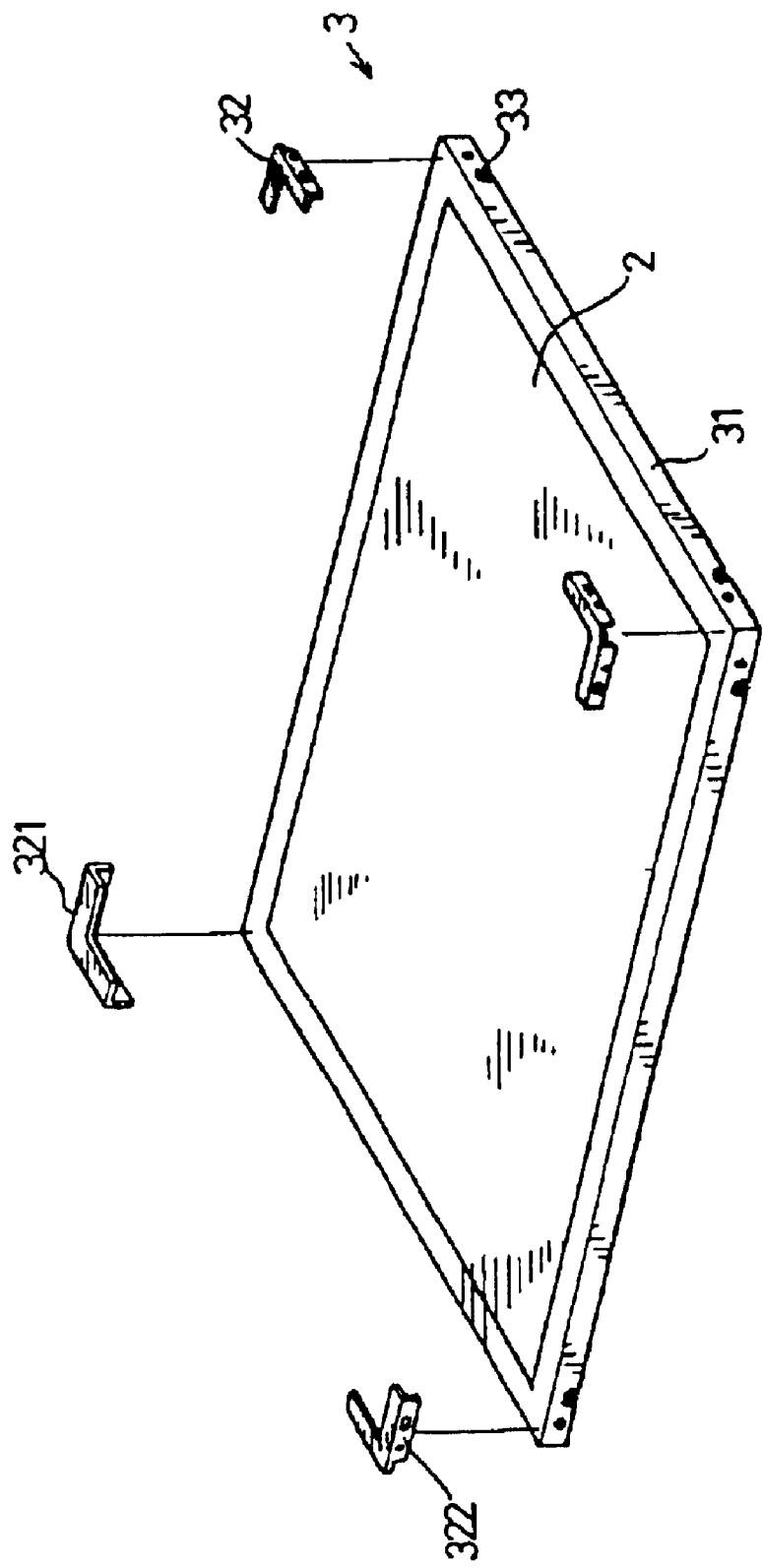
FIG. 2 is an exploded view illustrating a housing of liquid crystal display device according to the first embodiment of the invention.

FIG. 2 illustrates a liquid crystal display device comprising a panel module 2 and a housing 3; wherein the panel module 2 has generally a rectangular shape having four sides and four corners. The housing 3 comprises a mold frame 31, a plurality of fixing pieces 32 and a plurality of fixing structures 33. The mold frame 31 has intended rectangular shape having a thickness and comprises four corners and at least three rims connecting the corners, which are adapted to directly and firmly receive and hold the circumferential edges of the panel module 2. One rim of the mold frame 31 may also be replaced by a lamp module; thus, the mold frame 31 comprises only two corners and three rims. Each fixing piece 32 comprises a panel module fixing rib 321 and a lateral fixing portion 322 to be coupled to the mold frame 31 so as to fix the panel module 2 between the fixing pieces 32 and the mold frame 31. The panel fixing rib 321 is superimposed on partial edges of the panel module 2 to hold the panel module 2, while the lateral fixing portion 322 is superimposed on the partial rims of the mold frame 31 to be coupled to the mold frame 31. In the embodiment, the housing 3 comprises four fixing pieces 32 located at the four corners of the panel module 2 respectively. Each of the panel module fixing ribs 321 retains the two adjacent sides of the panel module 2 concurrently, while each of the lateral fixing portions 322 holds the two adjacent rims of the mold frame 31 concurrently. Each of the panel module fixing ribs 321 superimposed on the panel module 2 does not go beyond half way of a side of the panel module 2, whereas each of the lateral fixing portions 322 superimposed on the mold frame 31 does not go beyond half way of a side of the mold frame 31. The fixing structures 33 could be adapted to in fixing the liquid crystal display device to a system end.

The Second Embodiment

Figure 3A:
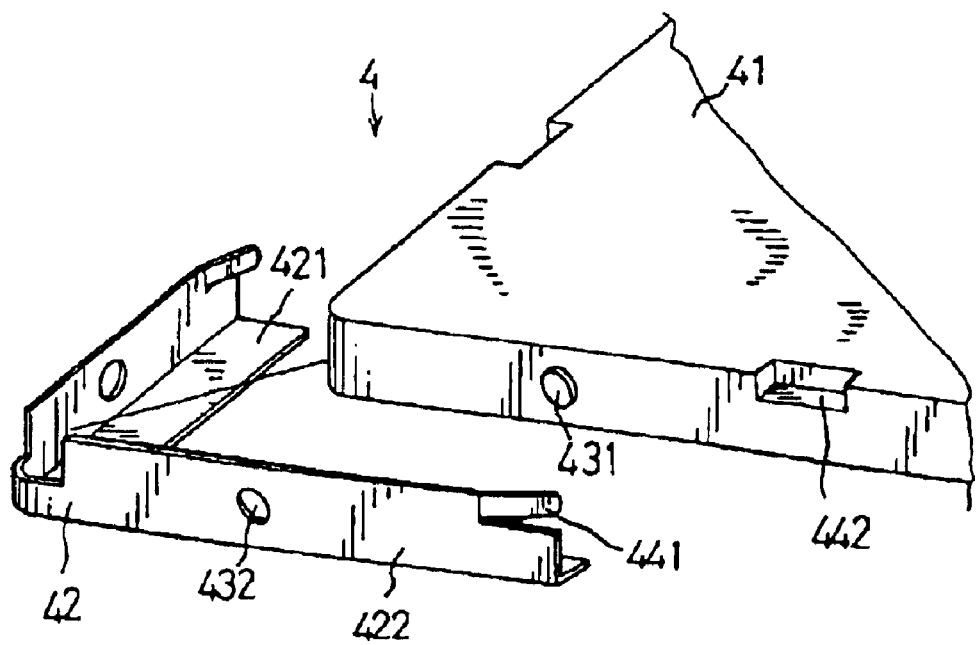
FIG. 3a is a partial exploded view illustrating a housing of liquid crystal display device according to the second embodiment of the invention.
Figure 3B:
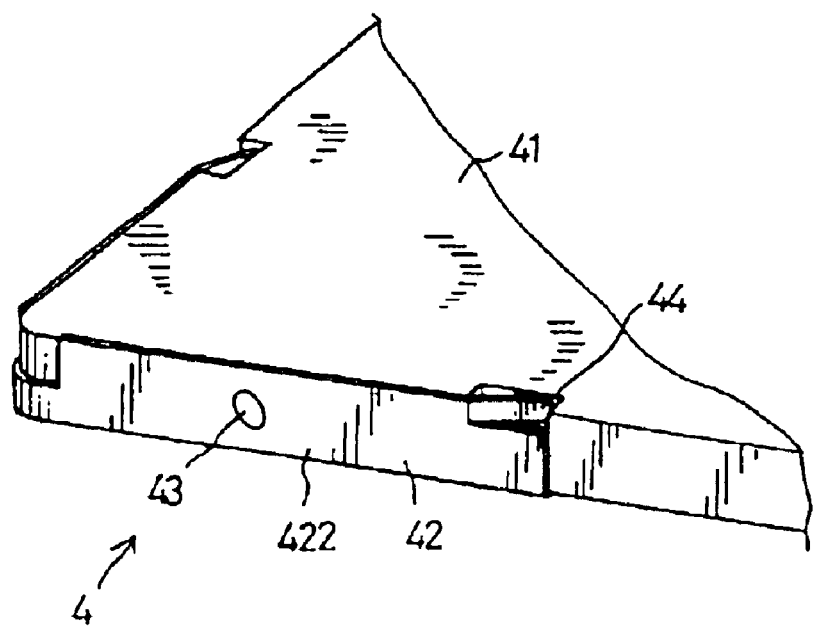

FIGS. 3a and 3b illustrate partial of a housing 4 of liquid crystal display device which is similar to the liquid crystal display device in the first embodiment and comprises a panel module (not shown). The housing 4 comprises a mold frame 41, a plurality of fixing pieces 42 with a panel module fixing rib 421 and a lateral fixing portion 422 and fixing structures 43 and 44.

Two forms of the fixing structures 43 and 44 are applied in one housing 4 in the embodiment. The fixing structures 43 comprising at least one positioning pin 431 and a positioning hole 432, wherein the positioning pin 431 is located on the mold frame 41, more preferably located on lateral sides of the mold frame 41 and protrudes outward from the rim of the mold frame 41, while the positioning hole 432 is located on the fixing piece 42 complying to positions of the positioning pin 431 on the mold frame 41. Referring to FIG. 3b, when coupling the fixing pieces 42 to the mold frame 41, the positioning pin 431 protrudes out of the positioning hole 432. More preferably, the poisoning pin 431 has a height and the fixing piece 42 has a thickness substantially equal to the height of the poisoning pin 431. The poisoning hole 432 allows the positioning pin 431 inserted therethrough, and the positioning hole 432 has a diameter and the poisoning pin 431 also has a diameter substantially equal to the diameter of the positioning hole 432.

The other fixing structure 44 in the embodiment comprising at least one tab 441 and a slot 442, wherein the finger 441 is located on the fixing piece 42, more preferably on the lateral fixing portion 422 and bending toward the mold frame 41, and the slot 442 is located in the mold frame 41 complying to position of the tab 441 and having shape corresponding to the tab 441 for receiving it. Stopping the tab 441 by the slot 442 attains fixation. More preferably, the tab 441 is located at an end edge of the lateral fixing portion 422, while the slot 442 is located where a bottom and one of the lateral sides of the mold frame 41 meets.

The Third Embodiment

Figure 4A:
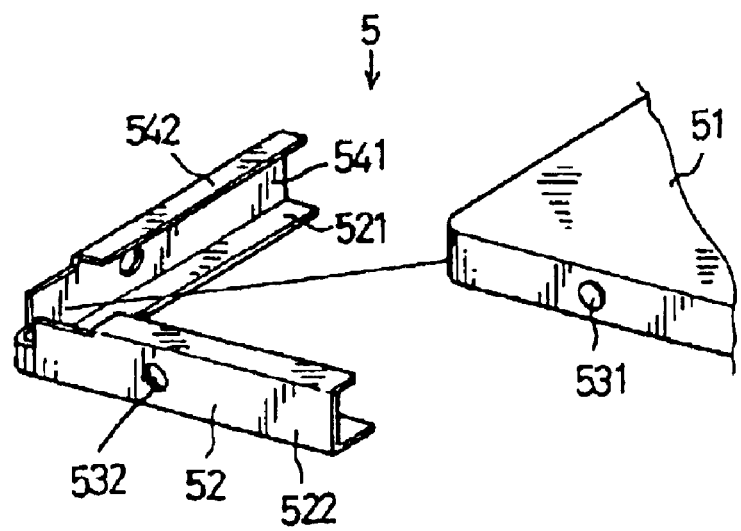
FIG. 4a is a partial exploded view illustrating a housing of liquid crystal display device according to the third embodiment of the invention.
Figure 4B:
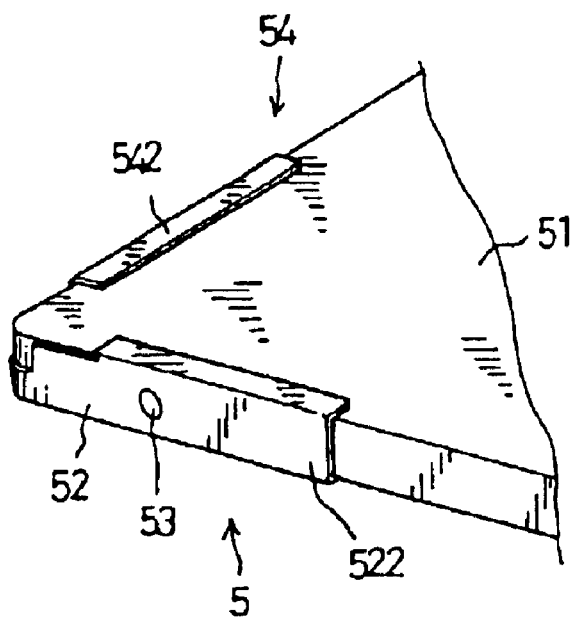

FIGS. 4a and 4b illustrate partial of a housing 5 of liquid crystal display device which is similar to the liquid crystal display device in the first embodiment and comprises a panel module (not shown). The housing 5 comprises a mold frame 51, a plurality of fixing pieces 52 with a panel module fixing rib 521 and a lateral fixing portion 522 and fixing structures 53 and 54. The fixing structure 53 comprising at least a positioning pin 531 and a positioning hole 532 is similar to the fixing structure 43 in the second embodiment.

The liquid crystal display device also comprises fixing structures 54 in the embodiment. The fixing structure 54 is provided by a groove 541 located on the fixing piece 52. The groove 541 is defined by the lateral fixing portion 522, the panel module fixing rib 521 and a mold frame fixing rib 542, and covers a lateral side of the mold frame 51, the panel module (not shown) and a bottom of the mold frame 51, respectively, whereby the mold frame 51 is adapted to be held therein (referring to FIG. 4b).

The Forth Embodiment

Figure 5A:
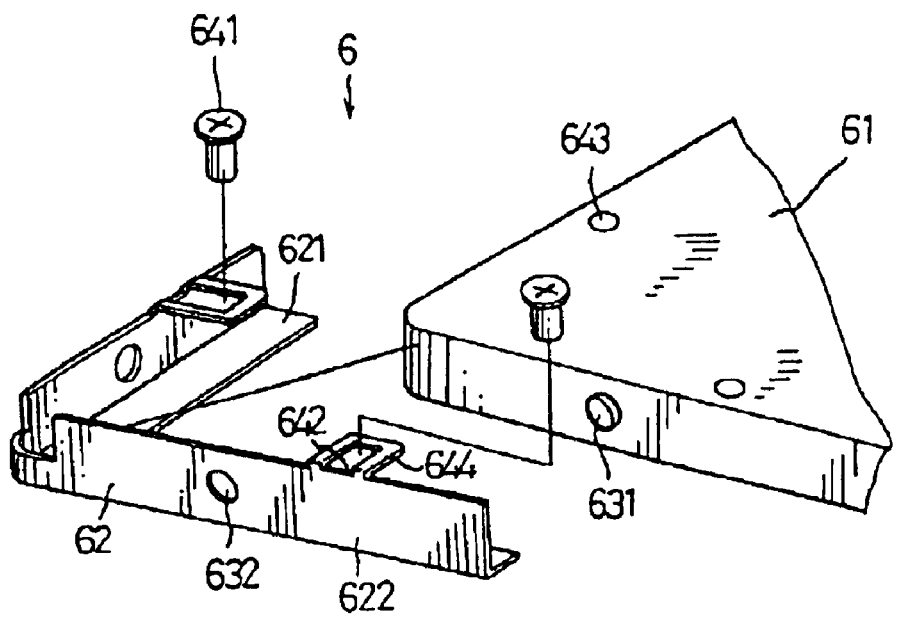
FIG. 5a is a partial exploded view illustrating a housing of liquid crystal display device according to the fourth embodiment of the invention.
Figure 5B:
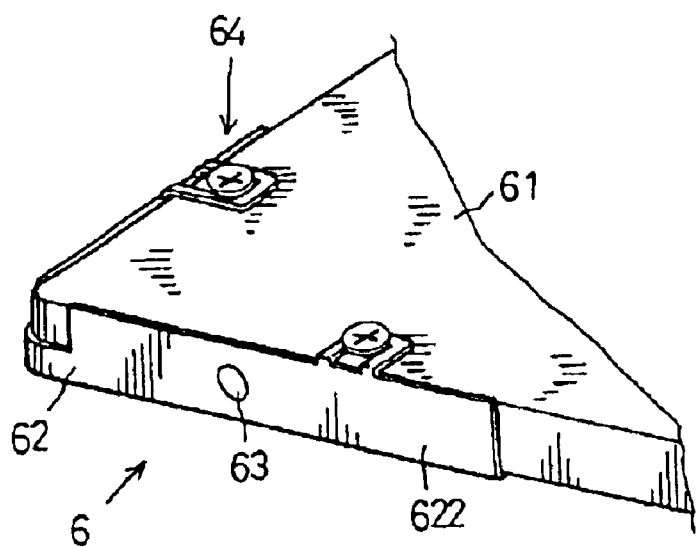

FIGS. 5a and 5b illustrate partial of a housing 6 of liquid crystal display device which is similar to the liquid crystal display device in the first embodiment and comprises a panel module (not shown). The housing 6 comprises a mold frame 61, a plurality of fixing pieces 62 with a panel module fixing rib 621 and a lateral fixing portion 622 and fixing structures 63 and 64. The fixing structure 63 comprising at least a positioning pin 631 and a positioning hole 632 is similar to the fixing structure 43 in the second embodiment.

The liquid crystal display device also comprises fixing structures 64 in the embodiment. The fixing structure 64 comprising a bolt 641, a through hole 642 located on the fixing piece 62 and a screw hole 643 located on the mold frame 61, wherein the bolt 641 is adapted to engage in the screw hole 643 through the through hole 642. The through hole 642 is defined by a window 644 extending from the lateral fixing portion 644 and the window 644 bends toward a bottom of the mold frame 61. The screw hole 643 is located on the bottom of the mold frame 61 corresponding to complying with the through hole 642 of the window 644 and fixes the fixing piece 62 to the mold frame 61 along with the fixing structures 63 (referring to FIG. 5b).

The Fifth Embodiment

Figure 6A:
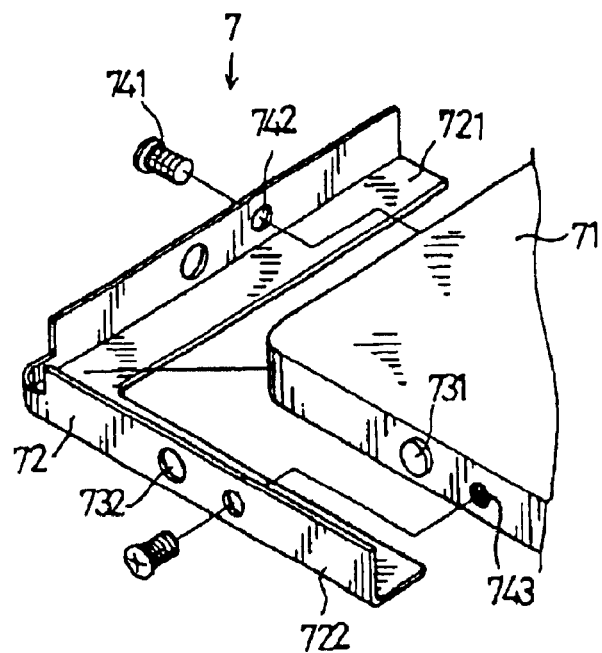
FIG. 6a is a partial exploded view illustrating a housing of liquid crystal display device according to the fifth embodiment of the invention.
Figure 6B:
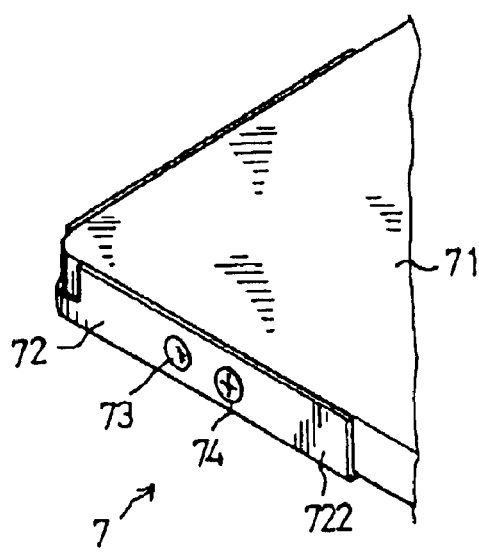

FIGS. 6a and 6b illustrate partial of a housing 7 of liquid crystal display device which is similar to the liquid crystal display device in the first embodiment and comprises a panel module (not shown). The housing 7 comprises a mold frame 71, a plurality of fixing pieces 72 with a panel module fixing rib 721 and a lateral fixing portion 722 and fixing structures 73 and 74. The fixing structure 73 comprising at least a positioning pin 731 and a positioning hole 732 is similar to the fixing structure 43 in the second embodiment.

The liquid crystal display device also comprises multiple fixing structures 74 in the embodiment. The fixing structure 74 is similar to the fixing structure 64 in the fourth embodiment, which comprising a bolt 741, a through hole 742 and a screw hole 743, wherein the through hole 742 is located on the lateral fixing portion 722 of the fixing piece 72 and the screw hole 743 is located on a lateral side of the mold frame 71. Positions of the through holes 742 are corresponding to complying with those of the through hole 742 and the bolt 741 cross through the through hole 742 to screw into the screw hole 743 (referring to FIG. 6b).

The Sixth Embodiment

Figure 7A:
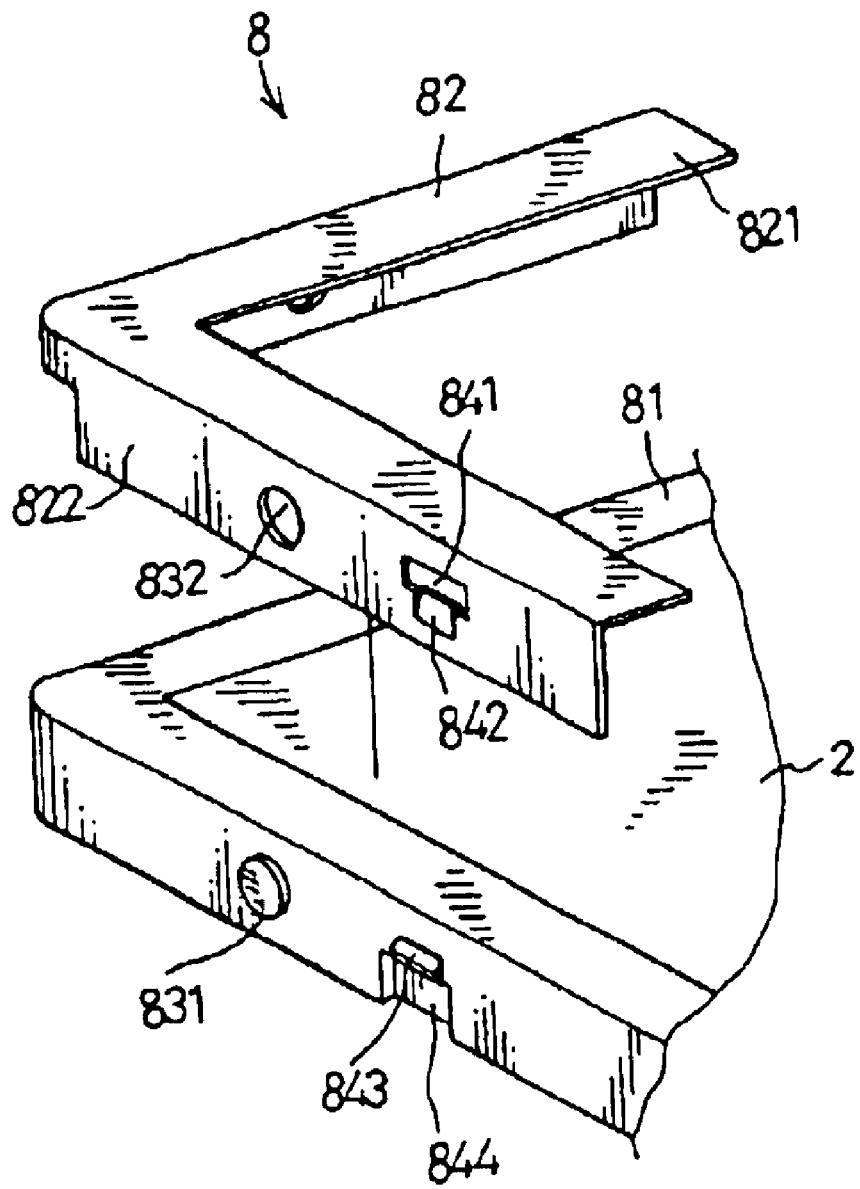
FIG. 7a is a partial exploded view illustrating a housing of liquid crystal display device according to the sixth embodiment of the invention.
Figure 7:
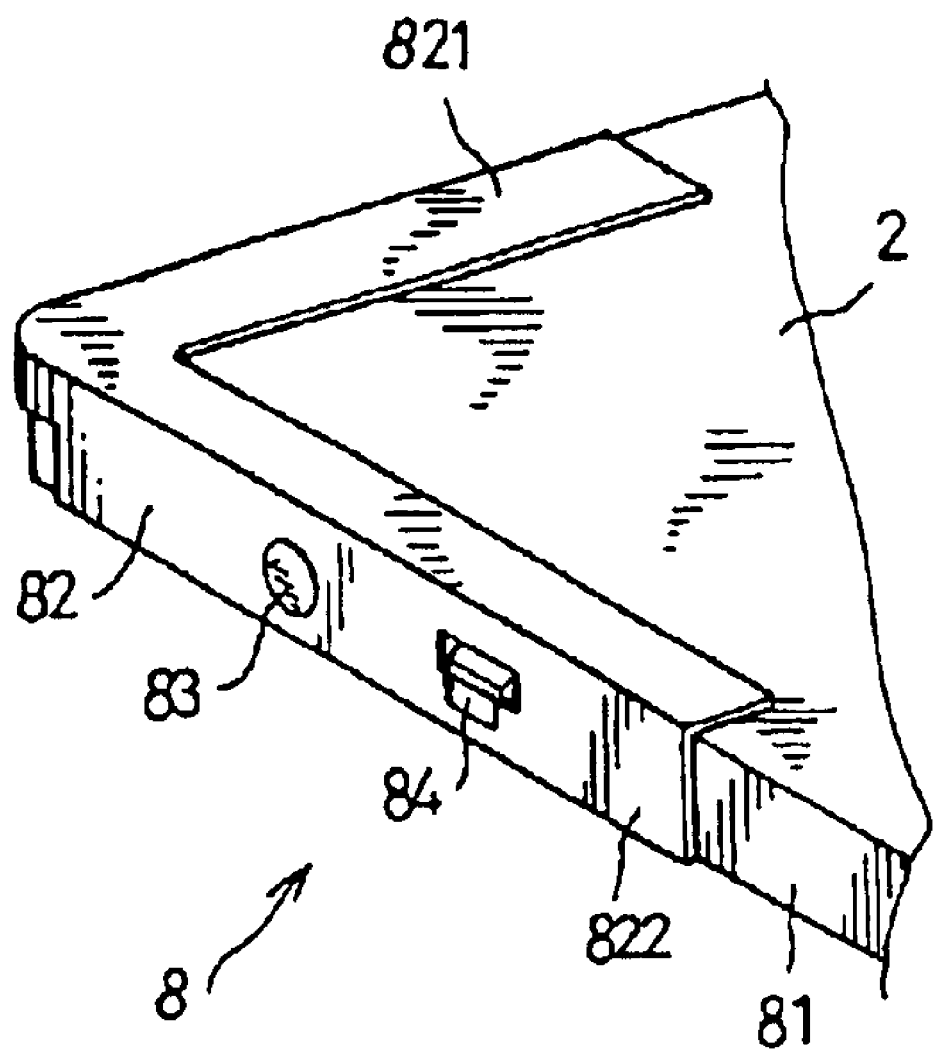

FIGS. 7a and 7b illustrate partial of a housing 8 of liquid crystal display device which is similar to the liquid crystal display device in the first embodiment and comprises a panel module (not shown). The housing 8 comprises a mold frame 81, a plurality of fixing pieces 82 with a panel module fixing rib 821 and a lateral fixing portion 822 and fixing structures 83 and 84. The fixing structure 83 comprising at least a positioning pin 831 and a positioning hole 832 is similar to the fixing structure 43 in the second embodiment.

The liquid crystal display device also comprises multiple fixing structures 84 in the embodiment. The fixing structure 84 comprises a receiving hole 841, a slope 842, a protrusion 843, and a receiving part 844. The receiving hole 841 and the slope 842 are located on the fixing piece 82, more preferably on the lateral fixing portion 842, while the protrusion 843 and the receiving part 844 are located on the mold frame 81 complying with the receiving hole 841 and the slope 842. The receiving hole 841 is adapted to receive the protrusion 843, and the protrusion 843 is guided by the slope 842 to successfully protrude out of the receiving hole 841 when assembling. At the same time, the receiving part 844 allows the slope 842 received therein (referring to FIG. 7b). Thus, the housing 8 is assembled by the fixing structures 84.

The First Test

The liquid crystal display devices in the second to sixth embodiments are conducted to shock tests to assay mechanical strength. The liquid crystal display devices in the invention are mounted to a shock machine separately to be assayed as shown in Table 1:

TABLE 1

| | Acceleration (G) | Duration (m sec) | Period (times/axis) | Axis |
|---|---|---|---|---|
| Test 1 | 50 | 11 | 3 | ±X、±Y、±Z |
| Test 2 | 260 | 2 | 1 | ±X、±Y、±Z |

Check statuses of the liquid crystal display devices in the present invention in a common condition and a strict condition illustrated in Table 1. No new defects occur in the all liquid crystal display devices in the invention after such tests. Besides, functions and appearances are normal and the liquid crystal display devices are qualified and utilized in this field.

The Second Test

The liquid crystal display devices in the second to sixth embodiments are conducted to vibration tests to assay fixing strength of the housings. The liquid crystal display devices in the invention are mounted to a vibration machine separately to be assayed as shown in Table 2:

TABLE 2

|  | Amount |
| --- | --- |
| Acceleration (G) | 2 |
| Frequency (Hz) | 10–500 |
| Period (minute/cycle) | 30 |
| Axis | Z |
| Amplitude (mm) | 2 |
| Duration (Hr/axis) | 2 |

Check statuses of other elements in the liquid crystal display devices in the present invention after the tests illustrated in Table 2. Taking tape automatic bonding as an example, check statuses of chips at a long side and a short side, respectively. All chips are qualified. Besides, shifts of the mold frame are also qualified.

Fixing pieces suitable in the invention can be deposited at four corners of the liquid crystal display device to fix the two adjacent sides or deposited in any positions on any side. Length, size and material are not limited; for example, a metal can be used as the material. Shapes and positions of the fixing structures in the present invention are not limited in the disclosures of the above embodiments either, and one of different kinds of fixing structures can be applied alone or combined with other kinds in one fixing piece. An advantage of the present invention is that a weight of a liquid crystal display device is reduced but a mechanical strength of the liquid crystal display device is not affected. Furthermore, the fixing pieces can lower the cost of manufacturing a metal frame in the prior art, and one size of the fixing piece in the invention can be applied in different sizes of liquid crystal display device. It avoids producing molds of metal frames in different sizes complying with different sizes of liquid crystal display device, and decreases costs thereby.

While embodiments of the present invention have been illustrated and described, various modifications and improvements can be made by persons skilled in the art. The embodiments of the present invention are therefore described in an illustrative but not restrictive sense. It is intended that the present invention is not limited to the particular forms as illustrated, and that all the modifications not departing from the spirit and scope of the present invention are within the scope as defined in the appended claims.

What is claimed is:

1. A liquid crystal display device comprising:

a panel module having generally a rectangular shape having four sides and four corners; and a housing which comprises a mold frame, a plurality of fixing piece and a plurality of fixing structures being adapted to fix the fixing pieces to the mold frame, wherein the mold frame is adapted to hold and receive the panel module, wherein each of the fixing pieces is located at a respective corner of the panel module and comprises a panel module fixing rib securely fitted onto the corner of the panel module, and a lateral fixing portion superimposed on lateral sides of the mold frame to be coupled to the mold frame so as to fix the panel module between the fixing pieces and the mold frame.

2. A liquid crystal display device according to claim 1, wherein each of the panel module fixing ribs superimposed on the panel module does not go beyond half way of a side of the panel module, whereas each of the lateral fixing portions superimposed on the mold frame does not go beyond halfway of a side of the mold frame.

3. A liquid crystal display device according to claim 1, wherein the panel module has generally a rectangular shape having four sides and four corners, the mold frame comprises at least three rims, the housing further comprises four fixing pieces located at the four corners of the panel module respectively, each of the panel module fixing ribs holds the two adjacent sides of the panel module while each of the lateral fixing portions retains the two adjacent rims of the mold frame concurrently.

4. A liquid crystal display device according to claim 1, wherein each of the fixing structures comprises a positioning pin located on the mold frame and a positioning hole located on the fixing piece to allow the positioning pin inserted therethrough.

5. A liquid crystal display device according to claim 4, wherein the poisoning pin has a height and the fixing piece has a thickness substantially equal to he height of the positioning pin, and wherein the positioning pin has a diameter and the positioning hole also has a diameter substantially equal to the diameter of the positioning pin.

6. A liquid crystal display device according to claim 1, wherein each of the fixing structures comprises a tab located on the fixing piece and a slot on the mold frame, of which the tab bends toward the mold frame and the slot has a shape corresponding to the tab for receiving the tab.

7. A liquid crystal display device according to claim 6, wherein the tab is located at an end edge of the lateral fixing portion and the slot located where a bottom and one of the lateral sides of the mold frame meets.

8. A liquid crystal display device according to claim 1, wherein the fixing structure comprises a groove and a mold frame fixing rib, of which the groove is defined by the lateral fixing portion, the panel module fixing rib and a mold frame fixing rib, whereby the mold frame is adapted to be received therein.

9. A liquid crystal display device according to claim 1, wherein each of the fixing structures comprises a bolt, an through hole formed on the fixing piece and a screw hole located on the mold frame, whereby the bolt is adapted to engage in the screw hole through the through hole.

10. A liquid crystal display device according to claim 9, wherein each of the fixing structures comprises a window extending from the lateral fixing portion and bending toward a bottom of the mold frame to define the through hole, the screw hole is located on the bottom of the mold frame corresponding to complying with the through hole of the window.

11. A liquid crystal display device according to claim 9, wherein the through hole is located on the lateral fixing portion of the fixing piece, and the screw hole is located on a lateral side of the mold frame.

12. A liquid crystal display device according to claim 1, wherein each of the fixing structures comprises a receiving hole and a slope located on the fixing piece, and a protrusion and a receiving part located on the mold frame, of which the receiving hole is adapted to receive the protrusion, and the receiving part allows the slope received therein.

13. A housing used in a liquid crystal display device, the liquid crystal display device comprising a panel module having generally a rectangular shape having four sides and four corners, wherein the housing comprises:

a mold frame being adapted to hold and receive the panel module;

a plurality of fixing pieces, wherein each of the fixing pieces is located at a respective corner of the panel module and comprises a panel module fixing rib securely fitted onto the corner of the panel module, and a lateral fixing portion superimposed on lateral sides of the mold frame to be coupled to the mold frame so as to fix the panel module between the fixing pieces and the mold frame; and a plurality of fixing structures being adapted to fix the fixing piece to the mold frame.

14. A housing according to claim 13, wherein each of the panel module fixing ribs superimposed on the panel module does not go beyond half way of a side of the panel module, whereas each of the lateral fixing portions superimposed on the mold frame does not go beyond half way of a side of the mold frame.

15. A housing according to claim 13, wherein the panel module has generally a rectangular shape having four sides and four corners, the mold frame comprises at least three rims, the housing further comprises four fixing pieces located at the four corners of the panel module respectively, each of the panel module fixing ribs retains the two adjacent sides of the panel module concurrently while each of the lateral fixing portions retains the two adjacent rims of the mold frame concurrently.

16. A housing according to claim 13, wherein each of the fixing structures comprises a positioning pin located on the mold frame and a positioning hole located on the fixing piece to allow the positioning pin inserted therethrough.

17. A housing according to claim 13, wherein each of the fixing structures comprises a tab located on the fixing piece and a slot on the mold frame, of which the tab bends toward the mold frame and the slot has a shape corresponding to the tab for receiving the tab.

18. A housing according to claim 13, wherein the fixing structure comprises a groove and a mold frame fixing rib, of which the groove is defined by the lateral fixing portion, the panel module fixing rib and a mold frame fixing rib, whereby the mold frame is adapted to be received therein.

19. A housing according to claim 13, wherein each of the fixing structures comprises a bolt, an through hole formed on the fixing piece and a screw hole located on the mold frame, whereby the bolt is adapted to engage in the screw hole through the through hole.

20. A housing according to claim 13, wherein each of the fixing structures comprises a receiving hole and a slope located on the fixing piece, and a protrusion and a receiving part located on the mold frame, of which the receiving hole is adapted to receive the protrusion, and the receiving part allows the slope received therein.

* * * * *